(12) United States Patent
Korolenko et al.

(10) Patent No.: US 12,553,122 B2
(45) Date of Patent: Feb. 17, 2026

(54) METHOD FOR FORMING AN LICOO2 FILM AND DEVICE FOR CARRYING OUT SAME

(71) Applicants: Iaroslav Anatolevich Korolenko, Moscow (RU); THE BATTERIES SP. ZO.O., Rzeszow (PL)

(72) Inventors: Iaroslav Anatolevich Korolenko, Moskow (RU); Airat Khamitovich Khisamov, Minskij (BY); Sergei Mikhailovich Nastochkin, Minsk (BY); Aleksandr Viktorovich Rossokhatyi, Verdun (CA)

( * ) Notice: Subject to any disclaimer, the term of this patent is extended or adjusted under 35 U.S.C. 154(b) by 0 days.

(21) Appl. No.: 18/270,505

(22) PCT Filed: Dec. 30, 2021

(86) PCT No.: PCT/RU2021/050458
§ 371 (c)(1),
(2) Date: Jun. 30, 2023

(87) PCT Pub. No.: WO2022/146200
PCT Pub. Date: Jul. 7, 2022

(65) Prior Publication Data
US 2024/0084438 A1  Mar. 14, 2024

(30) Foreign Application Priority Data
Dec. 30, 2020  (RU) .......................... RU2020144125

(51) Int. Cl.
*C23C 14/08* (2006.01)
*C23C 14/00* (2006.01)
(Continued)

(52) U.S. Cl.
CPC ........ *C23C 14/085* (2013.01); *C23C 14/0063* (2013.01); *C23C 14/35* (2013.01);
(Continued)

(58) Field of Classification Search
CPC ... C23C 14/085; C23C 14/0063; C23C 14/35; C23C 14/0042; C23C 14/0057;
(Continued)

(56) References Cited

U.S. PATENT DOCUMENTS 4,888,199 A * 12/1989 Felts .................. C23C 14/0042
204/298.03
8,628,645 B2    1/2014 Wang et al.
(Continued)

FOREIGN PATENT DOCUMENTS

DE        69722619       7/2003
FR         3017135       2/2016
(Continued)

OTHER PUBLICATIONS

TW-719346-B1 Translation (TW-202012656-A Equivalent) (Year: 2021).*

*Primary Examiner* — James Lin
*Assistant Examiner* — Patrick S Ott
(74) *Attorney, Agent, or Firm* — Brett A. Schenck

(57) ABSTRACT

A method of $LiCoO_2$ film formation involves depositing a $LiCoO_2$ layer on a substrate. This deposition is conducted by reactive magnetron sputtering of a metal cobalt (Co) target in lithium (Li) vapor onto a substrate in a vacuum chamber. A lithium tank is heated to the lithium melting point and a gas-carrier flow is fed through the heated lithium reservoir which results in the controlled feeding of lithium vapor to a magnetron system via a gas distributor. The gas distributor is connected to a working gas input and a lithium tank input. The regulated supply of lithium vapor is carried out by changing the gas-carrier flow and the lithium vapor is supplied from a heated tank.

14 Claims, 1 Drawing Sheet

(51) Int. Cl.
*C23C 14/35* (2006.01)
*H01J 37/34* (2006.01)
*H01M 4/02* (2006.01)
*H01M 4/04* (2006.01)
*H01M 4/1391* (2010.01)
*H01M 4/525* (2010.01)

(52) U.S. Cl.
CPC ....... *H01J 37/3405* (2013.01); *H01M 4/0426* (2013.01); *H01M 4/1391* (2013.01); *H01M 4/525* (2013.01); *H01J 37/3426* (2013.01); *H01J 2237/332* (2013.01); *H01M 2004/028* (2013.01)

(58) Field of Classification Search
CPC ... C23C 14/0036; C23C 14/08; C23C 14/228; C23C 14/548; C23C 14/0021; C23C 14/34; H01J 37/3405; H01J 37/3426; H01J 2237/332; H01M 4/0426; H01M 4/1391; H01M 4/525; H01M 2004/028; H01M 4/131; H01M 10/02; H01M 10/04; Y02E 60/10; Y02P 70/50
See application file for complete search history.

(56) References Cited

U.S. PATENT DOCUMENTS

| | | | |
|---|---|---|---|
| 2005/0098906 A1* | 5/2005 | Satoh | C23C 16/455 438/758 |
| 2007/0087185 A1* | 4/2007 | Wei | C23C 14/0641 204/192.15 |
| 2012/0082778 A1* | 4/2012 | Shimada | C23C 14/14 427/78 |
| 2014/0087092 A1* | 3/2014 | Nieh | H01M 4/139 118/723 VE |
| 2014/0261177 A1* | 9/2014 | Rasheed | C23C 14/0063 118/720 |
| 2017/0022598 A1* | 1/2017 | Schüßler | C23C 14/14 |
| 2019/0153582 A1* | 5/2019 | Todo | C23C 14/0094 |

FOREIGN PATENT DOCUMENTS

JP 61238958 10/1986
TW 202012656 A * 4/2020

* cited by examiner

METHOD FOR FORMING AN LICOO2 FILM AND DEVICE FOR CARRYING OUT SAME

AREA OF TECHNOLOGY

The invention relates to the field of the technological equipment and technologies for mass production, in particular, vacuum equipment and vacuum technologies for functional thin film (cathode) formation (deposition) with required electrical, physical and chemical properties.

LEVEL OF TECHNOLOGY

Magnetron technology is now widely used to form a $LiCoO_2$ cathode layer in thin-film solid-state batteries (called batteries hereinafter). This method is applied on the basis of RF/MF/DC systems using composite targets with specific Li/Co concentration and with doping of other materials for achieving required physical and chemical properties of the $LiCoO_2$ film.

The usage of such complex composite targets as well as the technology of thin film batteries production (magnetron sputtering from composite targets) limits both a choice of suppliers and productivity of deposition. The low productivity of magnetron methods and the high cost of equipment make the cost of producing solid state thin film batteries (batteries) very high. This prevents them from competing in the mass segment of consumer electronics. In addition, the usage of such composite targets strongly narrows the range of technological variability of the $LiCoO_2$ layer. It narrows the range of technological variability of the $LiCoO_2$ layer in terms of material concentration gradient formation by thickness, etc.

Also, the power limit for such targets should not exceed 5-10 W/cm2. At the same time, the deposition rate is typically not higher than 50-70 nm*m/min (for in-line equipment). These limits significantly reduce productivity and efficiency of the technological equipment and lead to increase a number of technological stations for $LiCoO_2$ deposition (sputtering) or to use other solutions, resulting in high cost of materials and high cost of thin film battery production. The cost of thin film battery production increases exponentially with the area of substrate.

For example, a method of applying a lithium cobalt oxide film to a battery substrate in a sputtering chamber is known in the prior art. See. [1] U.S. Pat. No. 8,628,645, IPC C23C 14/00, published 14 Jan. 2014.

This method of application includes:
(a) placement of the substrate array on the substrate support;
(b) providing the first and second sputtering targets in the sputtering chamber. The first and second sputtering targets consist of lithium metal oxide (LiMeOx);
(c) maintaining a sputtering gas at a pressure in the sputtering chamber;
(d) energizing the sputtering gas by applying an alternating voltage from an AC power supply to the first and second electrodes at a frequency of between about 10 and about 100 kHz such that each of the first and second electrodes alternately serves as an anode or a cathode;
(e) rotating the first and second rotatable magnet assemblies at a rotational frequency of between about 0.005 and about 0.1 Hz to provide a variable magnetic field about the first and second sputtering targets.

The appliance for carrying out the method contains:
(i) support for the substrate;
(ii) the first and second sputtering targets;
(iii) the first electrode which contacts the rear surface of the first sputtering target. The second electrode which contacts the rear surface of the second sputtering target;
(iv) a first magnetron which contains a first rotating magnet assembly behind the first sputtering target. The second magnetron contains a second rotating magnet assembly behind the second sputtering target.

The disadvantage of the analogue is the low deposition rate of the lithium metal oxide (LiMeOx) layer.

The disadvantage of the analogue is also the high cost of production of a thin film solid-state battery due to the usage of a $LiCoO_2$ targets.

The Essence of the Invention

The aims of this invention for $LiCoO_2$ cathode film deposition for mass production are to increase of $LiCoO_2$ film deposition rate (and hence to increase the productivity of equipment) and to change the raw materials for $LiCoO_2$ film deposition from complex composite $LiCoO_2$ targets to a simple and cheap materials (metal cobalt (Co) targets and metal lithium (Li) pellets). These processes are the objectives of this invention.

The technical result of the claimed invention is a radical reduction in the cost of mass production of thin-film solid-state batteries (accumulators) in comparison with current magnetron sputtering technology.

According to the invention the technical task is solved. Technical result is achieved by using the method of $LiCoO_2$ film formation (deposition), which includes $LiCoO_2$ deposition from metal cobalt (Co) target in lithium (Li) vapor based on reactive magnetron sputtering in vacuum chamber. Control of lithium vapor flow into vacuum chamber is realized through the gas distributor, which is connected to input of working gas and to input of lithium vapor such as from the tank. Lithium vapor flow is realized by pumping of gas-carrier flow through heated tank with lithium, heated to lithium melting point. Control of lithium vapor flow is realized by changing the flow of gas-carrier through heated tank with lithium.

Technical result is achieved by using the technological device for $LiCoO_2$ film deposition, which includes vacuum chamber, magnetron system with metal cobalt target, gas distributor, which is placed on perimeter or on the side of the magnetron system.

Gas distributor is connected to the input of the working gas and to the input of the heated tank with lithium through the valves; the heated tank with lithium is connected with the input of gas-carrier.

The technical result is also achieved by the fact that the gas distributor can be designed as a cavity or a labyrinth.

The technical result is also achieved by the fact that the heated lithium tank can be located inside or outside the vacuum chamber.

In sum, the method of $LiCoO_2$ thin film formation (deposition) includes the deposition of $LiCoO_2$ film on a substrate from metal cobalt (Co) target in lithium (Li) vapor by using of reactive magnetron sputtering in vacuum chamber. The lithium vapor is fed into the magnetron system in a controlled manner. The feeding is carried out via a gas distributor. This gas distributor is connected to the working gas input and the lithium tank input. Lithium vapor feeding is effected by means of gas-carrier flow through a heated lithium tank. This tank is heated to lithium melting point. The lithium vapor flow supply is controlled by changing the gas-carrier flow through the heated lithium tank. The technological device for $LiCoO_2$ film deposition contains a vacuum chamber, magnetron system with metal cobalt target, gas distributor, which is placed on perimeter or on the side of the magnetron system. Gas distributor is connected to the input of the working gas and to the input of the heated tank with lithium through the valves, the heated tank with lithium is connected with the input of gas-carrier. The gas distributor can be designed as a cavity or labyrinth distributor. The heated lithium tank can be positioned inside or outside the vacuum chamber. The invention enables a radical reduction in the cost of mass production of thin-film solid-state batteries (batteries). The invention enables an increase in the deposition rate of the $LiCoO_2$ film. The invention allows an increase in equipment productivity.

EXECUTION OF THE INVENTION

The method for $LiCoO_2$ thin film formation (deposition) on the substrate is a technology of reactive magnetron sputtering from metal cobalt target in lithium vapor. Substrates may be silicon wafers, mica sheets, or other materials.

Figure 1:
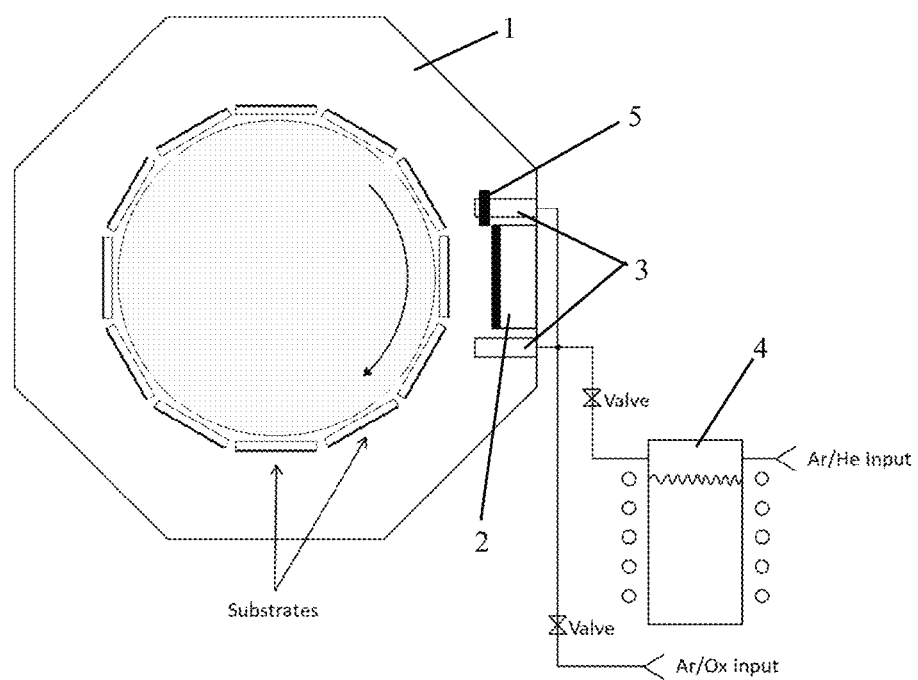
FIG. 1—Schematic diagram of the $LiCoO_2$ layer forming device.

FIG. 1 shows the technological device for $LiCoO_2$ thin film formation (deposition). It includes vacuum chamber (1) with magnetron system (2) and metal cobalt target.

The magnetron system (2) is a DC/AC magnetron with a magnetic system and an magnetic field (e.g. over 800 Gs). A gas distributor (3) is installed around the perimeter or on one side of the magnetron. This gas distributor is heated to 600-800 degrees Celsius. In the simplest case it may be a cavity distributor. In more complex versions it may be a labyrinth distributor. This gas distributor is connected via valves and/or taps to the working gas inlet and to a heated lithium tank (4) (lithium source).

Figure 2:
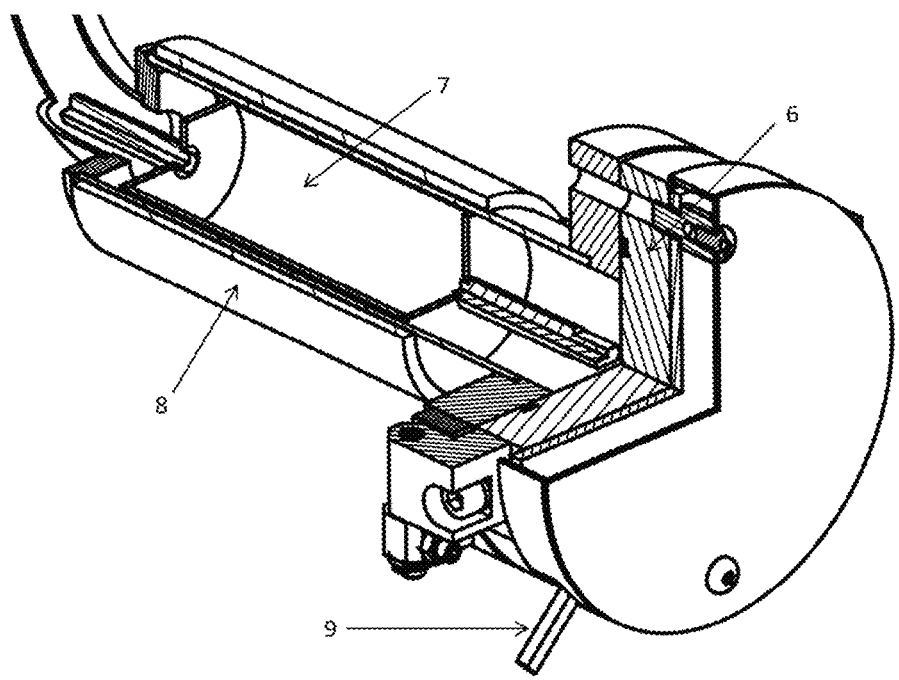
FIG. 2—Schematic diagram of a lithium vapor tank.
The following positions are marked on the figures:
1—vacuum chamber;
2—magnetron (system);
3—gas distributor;
4—heated tank;
5—spectrometer;
6—door for loading/unloading the lithium cassette;
7—lithium cassette;
8—heater;
9—nozzle for gas-carrier connection

This tank can be installed either inside or outside of the vacuum chamber. The lithium source (FIG. 2) is a heated tank (4) heated to 600 degrees Celsius. It is a tank or reservoir for lithium evaporation. A gas-carrier may be pumped through this tank. It can be an inert gas such as argon, helium, etc. The tank (4) preferably contains a door (6) which can have a metal seal for high temperature protection. A lithium cassette (7) may be installed inside the tank (4). A heater (8) is installed outside of the tank (4). The tank also has a nozzle (9) (inlet) for the gas-carrier connection. The tank is filled with lithium (e.g., in the form of pellets) in an inert atmosphere. The volume of lithium is calculated based on required period of device working. The time period is determined by the inter-service or process maintenance interval of the equipment. For mass production, the interval is from 7 days and longer. The tank is equipped with a system of high temperature valves. These valves isolate the tank from the outside atmosphere during maintenance and repair operations. A spectrometer (5) for spectral control of lithium and cobalt can be installed at the end of the magnetron.

The method of $LiCoO_2$ thin film formation (deposition) includes the deposition of $LiCoO_2$ film on a substrate from metal cobalt (Co) target in lithium (Li) vapor by using of reactive magnetron sputtering in vacuum chamber. Deposition by reactive magnetron sputtering in a vacuum chamber. Control of lithium vapor flow is realized through the gas distributor (into the magnetron). The gas distributor is connected to the input of working gas and to the input of lithium vapor. The lithium vapor is preferably delivered into the vacuum chamber by means of a gas-carrier flow e.g. through a heated tank with lithium. The tank with lithium is heated to a lithium melting point and preferably beyond for evaporation. The lithium vapor supply is controlled by changing the gas-carrier flow through the heated tank. The lithium vapor is fed into the magnetron system in a controlled manner. The feeding is carried out via a gas distributor. This gas distributor is connected to the working gas input and the lithium tank input. Lithium vapor feeding is effected by means of gas-carrier flow through a heated lithium tank.

The invention is carried out as follows according to an embodiment of the invention. Preferably the lithium cassette is loaded into the tank. A e.g. cobalt target is placed in the magnetron system. The installation is pumped to high vacuum. Checking and degassing the targets and/or the lithium reservoir/tank are carried out. The lithium tank is then heated to lithium melting point (liquid state). The heating may be followed by fixing and maintaining this temperature for the duration of the operation. The valve in the gas distribution system for lithium vapor feeding and can remain closed. The entire gas distribution system may also be heated to the required temperatures.

Once the evaporation system and lithium vapor supply have reached the specified temperature, the working gas may be fed to the magnetron system. This is preferably an inert gas such as argon, helium, etc. The working gas flow then be switched on and can be brought up to set power parameters. Preferably after this, the lithium vapor valve (tap) may be opened to the magnetron. The opening can take place e.g. by means of the gas-carrier. By varying the gas-carrier flow through the lithium tank, the amount of lithium vapor to the magnetron system can be controlled. This will change the parameters of the discharge and the $LiCoO_2$ film to be deposited. Deposition of the $LiCoO_2$ film takes preferably place in the environment of Li+Ar+Ox+additional inert gas (optional). By changing the ratio of the working gases and lithium vapor, the stoichiometry of the $LiCoO_2$ film can be changed within a very wide range.

The film deposition rate can also be varied. A spectrometer (5) can be used to control the deposition speed and stoichiometry of the $LiCoO_2$ film. This spectrometer may be used for spectral control of the lithium and cobalt. This spectrometer can be mounted at the magnetron system end. Maintaining the Li/Co (Co/Li) ratio by magnetron discharge parameters (discharge voltage) and by the amount of lithium vapor, the required parameters of the deposited film and deposition rate are ensured. This enables a radical reduction in the cost of mass production of thin-film solid-state batteries (batteries) compared to the current magnetron technology.

The claimed method of LiCoO$_2$ formation allows:
1. Increase the capacity of deposited material in comparison with composite LiCoO$_2$ (LCO) target.
2. Increase the deposition rate by using a metal target. Metal target allows to use higher power densities. Increase the deposition rate by a greater variability in the using of the working gases.
3. It is simple and reproducible enough to create material concentration gradients in the same process over the layer thickness.
4. Decrease the production cost of a thin-film battery (cell) structure. Decrease the production cost by using simple deposition materials.

The production cost of mass-produced thin-film solid-state batteries (accumulators) is reduced by two factors:
1) Increased LiCoO$_2$ film deposition rate (LCO) and hence an increased equipment productivity;
2) Using of more simple and cheap materials (metal cobalt targets and metal lithium pellets) instead of complex composite LiCoO$_2$ targets. Increased deposition rate is possible because of using reactive magnetron sputtering of metal cobalt (metal cobalt target is more cheaper, than the composite LiCoO$_2$ target, and cobalt deposition rate is 2.7 time higher, that LiCoO$_2$ deposition rate, as metal cobalt target allows more power supply in comparison with LiCoO$_2$ target) and delivering lithium vapor into area of cobalt magnetron sputtering (vacuum chamber) from the heated tank through gas distributor by using pumped gas-carrier (argon, helium, other).

The invention claimed is:

1. A method of forming a LiCoO$_2$ film involving a deposition of a LiCoO$_2$ layer on a substrate, the method comprising:
heating a lithium tank to a temperature sufficient to vaporize lithium metal, the temperature being above a lithium melting point and effective to form a vapor-phase lithium flow;
after heating the lithium tank, feeding a working gas to a magnetron system via a gas distributor;
after feeding the working gas to the magnetron system via the gas distributor, feeding a gas-carrier flow through the lithium tank in a manner that results in a controlled transport of lithium vapor, rather than liquid lithium, from the lithium tank to the magnetron system via the gas distributor, wherein the gas distributor is connected to a working gas input and a lithium tank input;
regulating a supply of the lithium vapor from the lithium tank by changing the gas-carrier flow; and
conducting the deposition of the LiCoO$_2$ layer on the substrate by reactive magnetron sputtering of a metal cobalt (Co) target in the lithium vapor onto the substrate in a vacuum chamber.

2. The method of claim 1, further comprising operating a spectrometer to control a deposition rate and stoichiometry of LiCoO$_2$.

3. The method of claim 1, further comprising closing a valve between the lithium tank and the gas distributor where the lithium vapor is being fed before feeding the working gas to the magnetron system via the gas distributor.

4. The method of claim 3 further comprising opening the valve between the lithium tank and the gas distributor where the lithium vapor is being fed after the working gas flow is switched on.

5. The method of claim 4, wherein the opening of the valve takes place by the gas-carrier.

6. The method of claim 1 further comprising heating the gas distributor to 600-800 degrees Celsius.

7. The method of claim 1, further comprising:
operating a spectrometer to control a deposition rate and stoichiometry of LiCoO$_2$;
closing a valve between the lithium tank and the gas distributor where the lithium vapor is being fed before feeding the working gas to the magnetron system via the gas distributor;
opening the valve between the lithium tank and the gas distributor where the lithium vapor is being fed after the working gas flow is switched on; and
heating the gas distributor to 600-800 degrees Celsius.

8. A method of forming a LiCoO$_2$ film involving a deposition of a LiCoO$_2$ layer on a substrate, the method comprising:
heating a lithium tank to a temperature sufficient to vaporize lithium metal, the temperature being above a lithium melting point and effective to form a vapor-phase lithium flow;
feeding a gas-carrier flow through the lithium tank in a manner that results in a controlled feeding of lithium vapor from the lithium tank to a magnetron system via a gas distributor, wherein the gas distributor is connected to a working gas input and a lithium tank input;
regulating a supply of the lithium vapor from the heated lithium tank by changing the gas-carrier flow;
operating a spectrometer to control a deposition rate and stoichiometry of LiCoO$_2$ and;
conducting the deposition of the LiCoO$_2$ layer on the substrate by reactive magnetron sputtering of a metal cobalt (Co) target in the lithium vapor onto the substrate in a vacuum chamber.

9. The method of claim 8, wherein feeding the gas-carrier flow through the lithium tank results in a controlled transport of lithium vapor, rather than liquid lithium, from the lithium tank to the magnetron system via the gas distributor.

10. A technological LiCoO$_2$ film forming device comprising:
a vacuum chamber with a magnetron system with a cobalt metal target;
a gas distributor, wherein the gas distributor is located on one side of the magnetron system or around its perimeter;
a spectrometer, wherein the spectrometer is mounted to an end of the magnetron system, wherein the spectrometer is operative to control a deposition rate and stoichiometry of LiCoO$_2$; and
a lithium tank, wherein the lithium tank is configured to heat lithium metal to a temperature sufficient to produce vapor-phase lithium for delivery to the magnetron system, wherein the gas distributor is connected to a working gas input via a first valve and/or a first tap, wherein the gas distributor is connected to a lithium tank input via a second valve and/or second tap, wherein the lithium tank is connected to a gas-carrier input.

11. The device of claim 10, wherein the lithium tank is located either inside or outside the vacuum chamber.

12. The device of claim 10 further comprising a lithium cassette, wherein the lithium cassette is installed inside the lithium tank, wherein the lithium tank comprises a door for loading and unloading the lithium cassette.

13. The device of claim 10, wherein the gas distributor is a cavity distributor.

14. The device of claim 10, wherein the gas distributor is a labyrinth distributor.

\* \* \* \* \*